United States Patent [19]

Öhlschläger et al.

[11] 4,366,221
[45] Dec. 28, 1982

[54] PHOTOGRAPHIC RECORDING MATERIAL AND NEW MEROCYANINES

[75] Inventors: Hans Öhlschläger, Bergisch Gladbach; Hans Langen, Bonn, both of Fed. Rep. of Germany

[73] Assignee: Agfa-Gevaert Aktiengesellschaft, Leverkusen, Fed. Rep. of Germany

[21] Appl. No.: 257,239

[22] Filed: Apr. 24, 1981

[30] Foreign Application Priority Data

May 3, 1980 [DE] Fed. Rep. of Germany ....... 3017069

[51] Int. Cl.³ ............................................. G03C 1/84
[52] U.S. Cl. .................................. 430/507; 430/522; 430/592; 542/431; 542/436; 542/444

[58] Field of Search ...................... 430/592, 522, 507; 542/431, 436, 444

[56] References Cited

U.S. PATENT DOCUMENTS 3,282,699 11/1966 Jones et al. .......................... 430/522
3,385,707 5/1968 Riester et al. ....................... 430/592

*Primary Examiner*—Won H. Louie, Jr.
*Attorney, Agent, or Firm*—Connolly and Hutz

[57] ABSTRACT

New merocyanines which have at least one water-solubilizing group are useful in photographic materials in antihalation and filter layers.

9 Claims, No Drawings

PHOTOGRAPHIC RECORDING MATERIAL AND NEW MEROCYANINES

This invention relates to a photographic recording material and to new merocyanines.

It is known to colour individual layers of light-sensitive photographic silver halide materials for the purpose of absorbing light of a certain range of wavelengths. Thus, for example, the backs of roll films and flat films are frequently covered with coloured layers of gelatine. These layers are intended not only to reduce the tendency of a film to roll up but also to absorb as completely as possible any rays of light not absorbed by the emulsion layers during exposure, in order to prevent scattering of light within the layers and hence the formation of a halo due to reflected light. An improvement can be obtained by arranging the coloured layer not on the back of the substrate but directly under the lowermost emulsion layer so that the film substrate is also protected against any back scattering of light.

It is also known to coat emulsion layers with a layer of dye in order to keep any unwanted light radiation away from the emulsion. Filter layers of multilayer colour photographic materials, for example, play a particularly important role for this purpose, e.g. a yellow filter layer may be provided under a blue sensitive layer in order that the layers underneath it, which have been sensitized to green or red light but also have an intrinsic sensitivity to blue light, may be protected against blue light. It is also known to improve the sharpness and reproduction of green in the region of strong exposure to light by arranging a filter layer containing a dye for absorbing green light between a green sensitized layer and a red sensitized layer underneath it.

The dyes used in antihalation or filter layers are required to fulfil many conditions. For example, they should have a suitable spectral absorption for their particular purpose and should be decolourised or washed out during processing of the material. The dyes must not have any harmful effect on the properties of the silver halide emulsion layers.

When the dyes are used in filter layers, they should generally be fixed in a diffusion-fast form so that they cannot diffuse into adjacent emulsion layers. Many methods of fixing dyes in hydrophilic colloid layers are known. The method used most frequently consists of fixing an acid dye with a basic polymer, a so-called mordant. The following are examples of compounds which have been disclosed as mordants for acid compounds: Quaternised nitrogen compounds in German Pat. No. 928,268; reaction products of polyvinyl ketones and aminoguanidines in U.S. Pat. No. 2,882,156; quaternised basic polyurethanes in German Offenlegungsschrift No. 2,315,304 (U.S. Pat. No. 3,877,945) and polymers of 2-methyl-1-vinylimidazole in British Pat. No. 685,475 (U.S. Pat. No. 2,675,316).

When a layer of mordant is used for dyes, the dye and mordant must be carefully adjusted to each other for each specific case. Not only the structure of the mordant but also the structure of the dye is of great importance in ensuring the diffusion resistance of a dye and the capacity of a layer to be decolourised when processed.

There have been many attempts to find dyes which can be fixed with mordants and which are decolourised by processing of the photographic material or are washed out of the layer. Oxonole, cyanine and hemicyanine and styryl dyes have become known for this purpose. Among the various water-soluble dyes, sulphonated merocyanines having a benzoxazole nucleus and a pyrazolin-5-one nucleus are particularly suitable since they are decolourised in developers containing sulphite and have no harmful effect on the photographic properties of an emulsion. The merocyanines described in U.S. Pat. No. 3,148,187 are well known examples. The mordants, however, do not fix the dyes sufficiently firmly, with the result that the dyes partly diffuse into adjacent layers when the light-sensitive material is stored.

Fixing of dyes with mordants is generally not necessary when using dyes for antihalation layers which are located on the side of the substrate of the photographic material facing away from the light-sensitive emulsion layers. Moreover, fixing of the dyes is not absolutely necessary if the dyes are used as correcting dyes for adjusting the sensitivity or if they are used for improving the sharpness.

One object of the present invention was to provide new dyes which would be suitable for photographic materials. It was in particular an object of this invention to find dyes which could be introduced into a hydrophilic colloid layer and fixed by mordants. Furthermore, the dyes according to the invention should be decolourised during processing of the photographic material and have no harmful effect on the photographic properties of the material.

The following compounds have now been found:

Merocyanines corresponding to the following formula having at least one water-solubilising group:

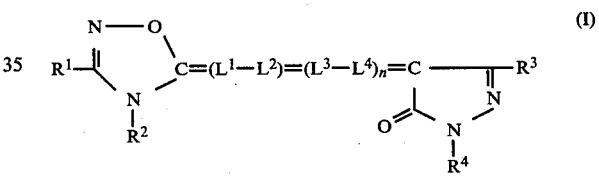

(I)

in which
$R^1$ represents
(1) a saturated or unsaturated alkyl or cycloalkyl group preferably having up to 6 carbon atoms which may be substituted or unsubstituted, for example a methyl group, an ethyl group, a hydroxyethyl group, a propyl group, a cyclohexyl group or a benzyl group;
(2) an aryl group which may be substituted or unsubstituted, for example a phenyl group, a tolyl group, a chlorophenyl group, a sulphophenyl group, a sulphonamidophenyl group or a naphthyl group;

$R^2$ represents a saturated or unsaturated alkyl group preferably having up to 4 carbon atoms which may be unsubstituted or substituted, e.g. with halogen, hydroxyl, amino, phenyl, carboxyl, sulpho, carbonamido, carbamoyl, carbalkoxy or sulphato;

$R^3$ represents
(1) an alkyl or cycloalkyl group preferably having up to 6 carbon atoms, which may be substituted or unsubstituted, for example a methyl group, an ethyl group, a hydroxyethyl group, a cyanoethyl group, a hydroxyethoxyethyl group, a propyl group, an isopropyl group, a butyl group, a tert.-butyl group, a hexyl group, a cyclohexyl group or a benzyl group;
(2) an aryl group which may be substituted or unsubstituted, for example, a phenyl group, a tolyl group, an ethylphenyl group, a chlorophenyl group, a methoxyphenyl group or a naphthyl group;
(3) a carboxylic acid or carboxylic acid ester group COOR$^5$; or
(4) a carboxylic acid amide group CO-NR$^6$R$^7$;

R$^4$ represents
(1) an alkyl group having a maximum of 6 carbon atoms, which may be substituted or unsubstituted,
(2) a heterocyclic group which may be substituted or unsubstituted, in particular a 5- to 6-membered heterocyclic group containing nitrogen, especially benzothiazole;
(3) an aryl group which may be substituted or unsubstituted, especially a phenyl or naphthyl group which may be substituted by halogen, alkyl preferably having up to 4 carbon-atoms such as methyl or ethyl, hydroxyl, alkoxy such as methoxy, carboxyl, carbonamido, amino, sulpho, sulphonamido or carbalkoxy;

R$^5$, R$^6$, R$^7$ which may be the same or different, represent
(1) hydrogen,
(2) an alkyl group preferably having up to 6 carbon atoms which may be substituted or unsubstituted, for example a methyl group, an ethyl group, a hydroxyethyl group, a cyanoethyl group, a hydroxyethoxyethyl group, a propyl group, an isopropyl group, an allyl group, a butyl group, a tert.-butyl group, a hexyl group, a cyclohexyl group or a benzyl group;
(3) an aryl group which may be substituted or unsubstituted, for example, a phenyl group, a tolyl group, an ethylphenyl group, a chlorophenyl group, a methoxyphenyl group or a naphthyl group; and/or R$^6$ and R$^7$ may together represent the ring members required to complete a heterocyclic ring, preferably the ring members required to complete a 5-membered or 6-membered ring containing nitrogen, to which ring other rings may be attached by condensation; for example the members required to complete the following rings: Pyrrolidine, piperidine, cyclohexamethyleneimine, indoline, tetrahydroquinoline, morpholine, thiomorpholine, piperazine or N-methylpiperazine;

L$^1$, L$^2$, L$^3$ and L$^4$ represents a methine group which may be unsubstituted or substituted with an alkyl group having 1 to 4 carbon atoms, such as methyl or ethyl, and
n=0 or 1;

provided that at least one of the substituents R$^1$, R$^3$ and R$^4$ contains at least one water-solubilizing group.

By "water-solubilizing group" are meant in particular sulpho, carboxyl and phosphoric acid ester groups. In a preferred embodiment, at least one of the groups, R$^1$, R$^3$ or R$^4$, contains a sulpho group attached to an aromatic group preferably to phenyl or naphthyl. R$^1$–R$^7$ and L$^1$–L$^4$ may be substituted. Suitable substituents are those which are common for merocyanines in photographic materials, preferably an alkyl group, an aryl group, halogen, hydroxyl, alkoxy, carboxyl, carbonamido, amino, sulfo, sulfonamido or carbalkoxy.

There has also been found a light-sensitive photographic material comprising a support layer, at least one light-sensitive silver halide emulsion arranged on it, and optionally other layers, which material contains at least one compound of the formula (I) in at least one layer.

The properties of the dyes, as regards their solubility, ability to be fixed in mordants and ability to be decolourised in the desired manner can be influenced by suitable choice of the substituents and thereby adapted to the particular purpose. The compounds corresponding to the above formula may, of course, also be used in the form of their salts, e.g. salts with alkali metals or amines of the type.

The following are examples of suitable compounds:

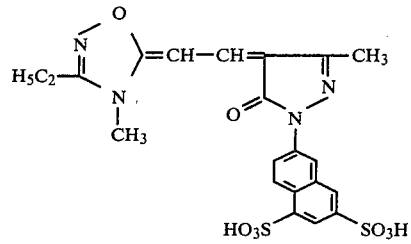
1

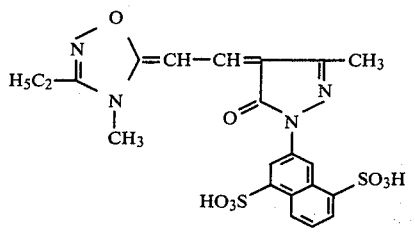
2

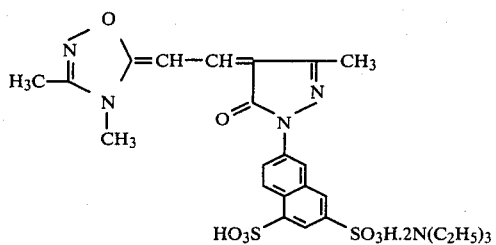
3

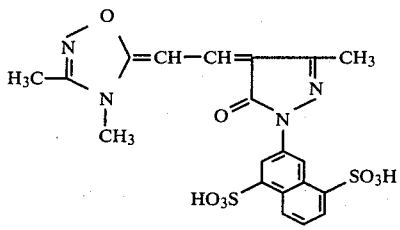
4

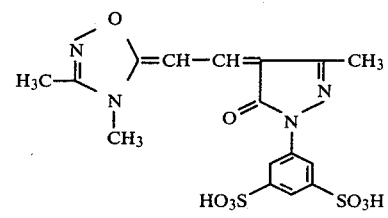
5

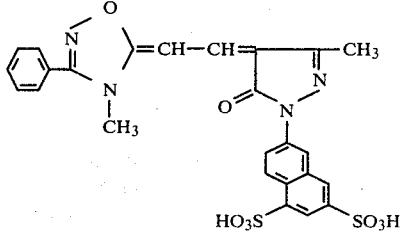
6

-continued
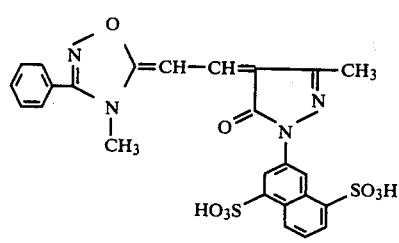 7
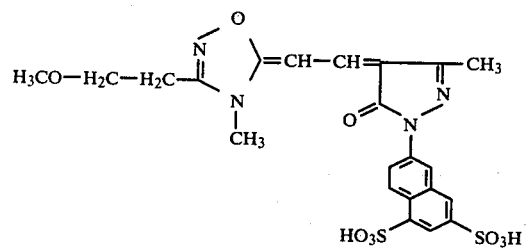 8
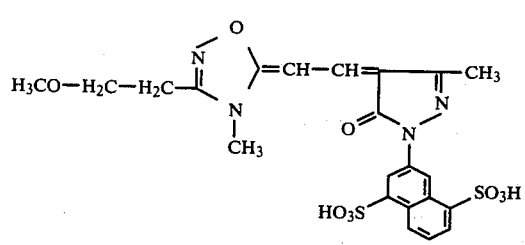 9
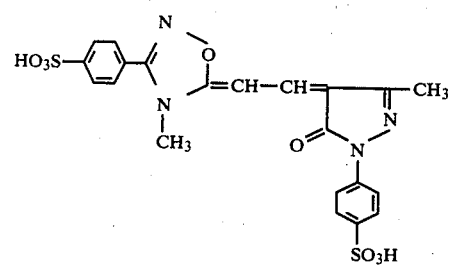 10
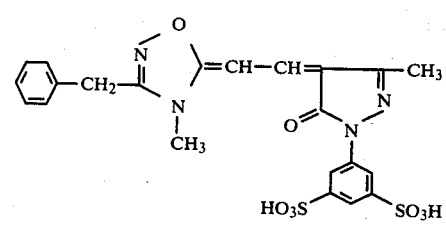 11
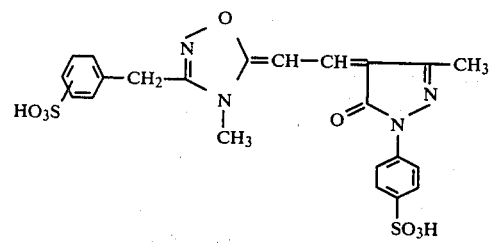 12
-continued
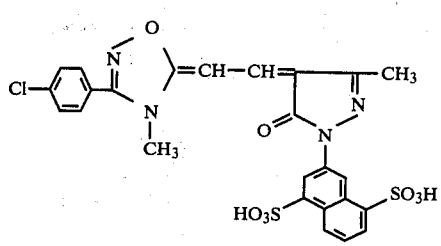 13
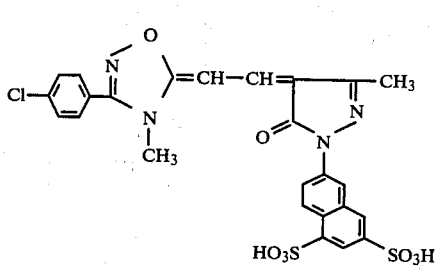 14
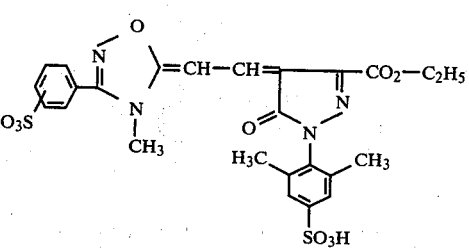 15
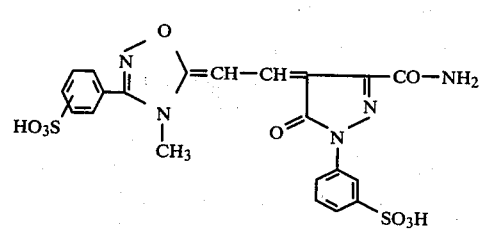 16
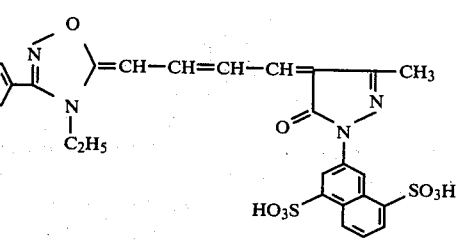 17
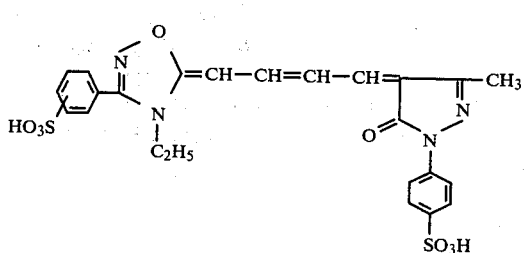 18

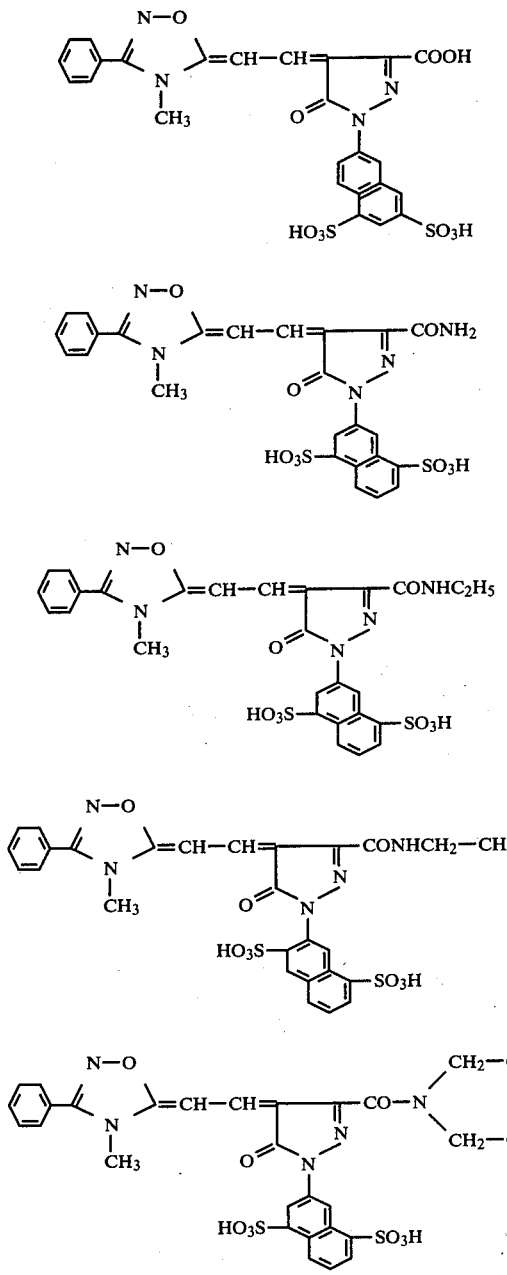

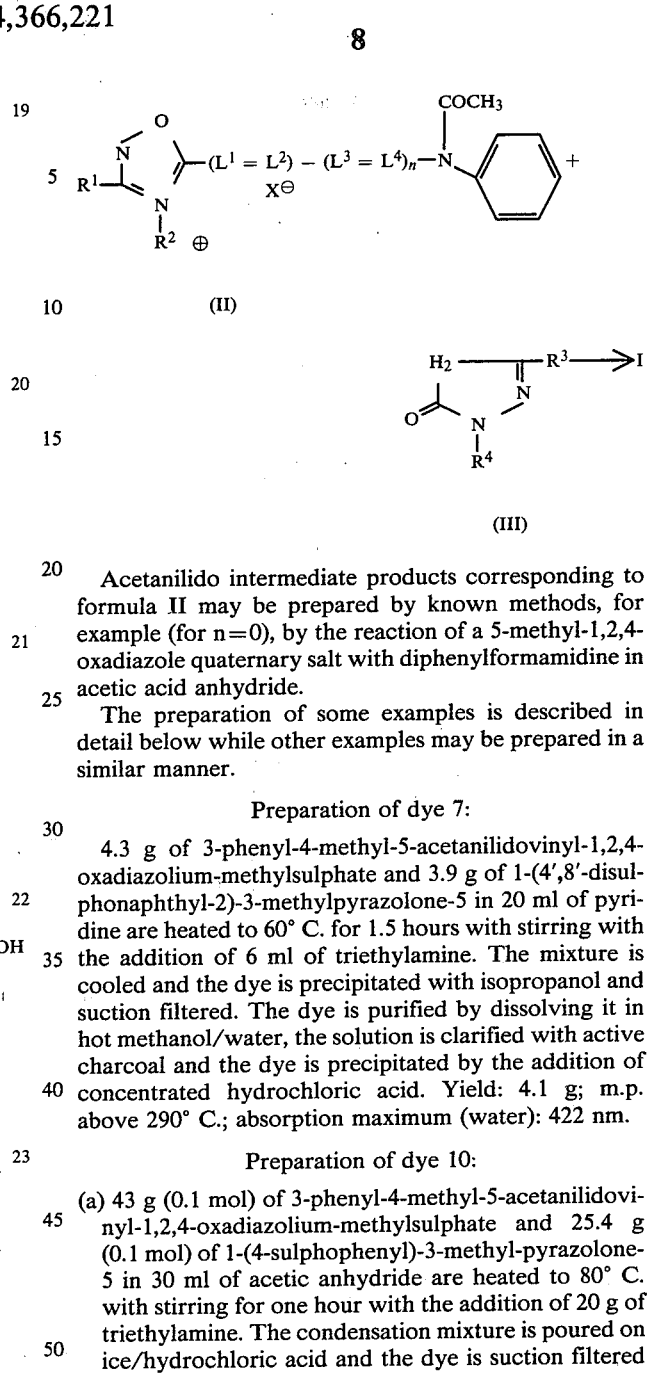

The merocyanine dyes according to the invention may be prepared by similar methods to known merocyanines. Suitable methods of synthesis have been described in "The Cyanine Dyes and Related Compounds", by F. M. Hamer, Interscience Publishers, John Wiley & Sons, New York (1964). The dyes according to the invention may be prepared by condensation of anilido or acetanilido compounds II with pyrazolin-5-ones III in the presence of suitable condensing agents such as pyridine, piperidine or triethylamine:

Acetanilido intermediate products corresponding to formula II may be prepared by known methods, for example (for n=0), by the reaction of a 5-methyl-1,2,4-oxadiazole quaternary salt with diphenylformamidine in acetic acid anhydride.

The preparation of some examples is described in detail below while other examples may be prepared in a similar manner.

Preparation of dye 7:

4.3 g of 3-phenyl-4-methyl-5-acetanilidovinyl-1,2,4-oxadiazolium-methylsulphate and 3.9 g of 1-(4',8'-disulphonaphthyl-2)-3-methylpyrazolone-5 in 20 ml of pyridine are heated to 60° C. for 1.5 hours with stirring with the addition of 6 ml of triethylamine. The mixture is cooled and the dye is precipitated with isopropanol and suction filtered. The dye is purified by dissolving it in hot methanol/water, the solution is clarified with active charcoal and the dye is precipitated by the addition of concentrated hydrochloric acid. Yield: 4.1 g; m.p. above 290° C.; absorption maximum (water): 422 nm.

Preparation of dye 10:

(a) 43 g (0.1 mol) of 3-phenyl-4-methyl-5-acetanilidovinyl-1,2,4-oxadiazolium-methylsulphate and 25.4 g (0.1 mol) of 1-(4-sulphophenyl)-3-methyl-pyrazolone-5 in 30 ml of acetic anhydride are heated to 80° C. with stirring for one hour with the addition of 20 g of triethylamine. The condensation mixture is poured on ice/hydrochloric acid and the dye is suction filtered and washed with isopropanol. Yield: 25.5 g; m.p. above 300° C.

(b) 10 g of the dye prepared under (a) are scattered into 25 ml of 20% oleum at room temperature with stirring. The mixture is stirred for a further 4 hours at 100° C., cooled and poured on ice. The dye is suction filtered and washed with isopropanol. Yield: 6.8 g; m.p.: 256° C. with decomposition. Absorption maximum (water): 420 nm.

The dyes may be incorporated with a hydrophilic colloid layer of a material according to the invention by conventional methods. For example, an aqueous solution of the dyes at a suitable concentration may be added to an aqueous solution of a hydrophilic colloid. The solution may then be applied in known manner to a substrate or other layer of the photographic light-sensitive element.

The quantity of dyes added to the aqueous solution of the hydrophilic colloid is selected within the solubility range of the dyes according to the purpose for which the dyes are to be used. Aqueous solutions of the dyes are generally used at a concentration ranging from about 0.5 to about 3% by weight. The photographic light-sensitive element preferably contains from 10 to 1000 mg, in particular from 8 to about 800 mg of the dyes per m².

When preparing the material according to the invention, it is advantageous to add the dye to a hydrophilic colloid layer containing a basic polymer, although the dyes may be added to other layers. In the latter case, they may be incorporated with a layer situated close to the layer containing the basic polymer, preferably an adjacent layer. In the latter case, the dyes diffuse into the layer containing the basic polymer and are concentrated there under the action of the mordant. The layer containing the basic polymer is thus selectively coloured in the finished light-sensitive element. The dyes may be incorporated with two or more layers.

The hydrophilic colloid layer containing the basic polymer may be a single layer or it may consist of two or more layers. This layer or layers may be located above the photographic emulsion layer (i.e. further removed from the substrate), between two emulsion layers if a plurality of photographic emulsion layers is present, or between the substrate and the photographic emulsion layer. The layer which is selectively coloured due to the presence of the basic polymer may serve as filter layer, antihalation layer or some other layer, according to the layer arrangement.

The basic polymer is present in at least one hydrophilic colloid layer in the light-sensitive elements according to the invention. The basic polymer is preferably a water-soluble high molecular weight compound which contains basic groups in the main chain or in branches and is compatible with gelatine. Examples of suitable basic polymers include high molecular weight substances which contain basic groups with tertiary or quaternary nitrogen in the main chain or the side chains. These are basic hydrophilic high molecular weight substances which are conventionally used as mordants for acid dyes in hydrophilic colloid layers of photographic light-sensitive silver halide elements.

Typical examples include polymers obtained by the polymerisation of an ethylenically unsaturated compound containing a dialkylaminoalkyl ester group, as described in U.S. Pat. No. 2,675,316; copolymers of the above mentioned ethylenically unsaturated compound and acrylamide, as described in U.S. Pat. No. 2,839,401; basic polymers prepared from maleic imide (including maleic imide derivatives) and copolymers of such maleic imide derivatives and styrene as described in U.S. Pat. Nos. 3,016,306 and 3,488,706; polymers having 2-methylimidazole nuclei in the side chains, as described in U.S. Pat. No. 3,445,231; addition polymers prepared from bis-acrylamide as secondary diamines, and quaternary salts of these polymers, as described in U.S. Pat. No. 3,795,519; polymers such as polyvinyl pyridine or polyvinyl quinoline, as described in British Pat. No. 765,520 and U.S. Pat. No. 2,721,852, and polymers such as those described in U.S. Pat. No. 3,624,229 and German Offenlegungsschrift No. 1,914,362 (EB 1221 131).

Polymers obtained by the reaction of polyvinyl alkyl ketones (e.g. polyvinyl methyl ketone) or polyvinyl aldehydes (e.g. polyacrolein) with aminoguanidine, as described in U.S. Pat. No. 2,882,156, may also be used.

A combination of these special polymers with the dyes is essential for carrying out the invention in practice, as described in U.S. Pat. No. 3,282,699. On the other hand, satisfactory results may be obtained according to the invention by using various polymers as described above.

The mordants described in German Offenlegungsschrift 2 941 819 are particularly suitable.

The quantity of basic mordant polymer normally used ranges from about 1 to about 5 equivalents, based on the basic group of the polymer, per equivalent of acid group of the merocyanine dye used according to the invention although the quantity of basic mordant polymer is not, of course, limited to the range mentioned above.

The merocyanines according to the invention may also be used without mordants, in particular an antihalation dyes, for example at the back of the substrate of the photographic material or as correction dyes for controlling the sensitivity of the photographic material or for improving the sharpness.

The hydrophilic colloid layers of the light-sensitive elements according to the invention may contain various additives to improve the quality of the photographic light-sensitive elements. Examples include hardeners, coating auxiliaries, plasticizers, lubricants, matting agents, emulsion polymerisation latices, antistatic agents, UV absorbents and antioxidants. These additives are present in addition to the hydrophilic colloids, the dyes and the mordants.

The light-sensitive elements according to the invention and in particular the coloured layers are easily and irreversibly decoloured by photographic processing, and no residual colour is left after processing. Moreover, the possibilities of photographic processing are not deleteriously affected by discolouration.

The present invention is suitable for photograhic materials containing any silver halide emulsions. The silver halide contained in these emulsions may be silver bromide, silver chloride or mixtures thereof, which may have a small silver iodide content of up to 10 mol %.

The photographic materials may be developed with the usual developer substances, e.g. N,N-dimethyl-p-phenylene diamine; 4-amino-3-methyl-N-ethyl-N-methoxyethylaniline; 2-amino-5-diethylaminotoluene; N-butyl-N-ω-sulphobutyl-p-phenylene diamine; 2-amino-5-(N-ethyl-N-$\beta$-methanesulphonamidoethylamino)-toluene; N-ethyl-N-$\beta$-hydroxyethyl-p-phenylene diamine; N,N-bis-($\beta$-hydroxyethyl)-p-phenylene diamine and 2-amino-5-(N-ethyl-N-$\beta$-hydroxyethylamino)-toluene. Other suitable colour developers have been described, for example in J. Amer. Chem. Soc. 73, 3100 )(1951).

The photographic material may contain the usual colour couplers, which may be incorporated directly in the silver halide layers. Examples of suitable colour couplers are described in the publication "Farbkuppler" by W. Pelz in "Mitteilungen aus den Forschungslaboratorien der Agfa, Leverkusen/München", Volume III (1961), and by K. Venkataraman in "The Chemistry of Synthetic Dyes", Vol. 4, pages 341 to 387, Academic Press, 1971.

2-Equivalent couplers may also be used as non-diffusible colour couplers, for example the known DIR couplers. The non-diffusible colour couplers and the colour producing compounds may be added to the light-sensitive silver halide emulsions or to other casting solutions by the usual, known methods.

If the non-diffusible colour couplers and colour producing compounds are insoluble in water and alkalies, they may be emulsified in known manner. So-called coupler solvents or oil formers may, if desired, be added for emulsifying such hydrophobic compounds; see, for example, U.S. Pat. Nos. 2,322,027; 2,533,514; 3,689,271; 3,764,336 and 3,765,897.

Gelatine is the substance preferably used both as binder and as hydrophilic colloid for the photographic layers although this may be partly or completely replaced by other natural or synthetic binders.

The emulsions may also be chemically sensitized, e.g. by the addition of sulphur compounds such as allyl isothio cyanate, allylthiourea or sodium thiosulphate during chemical ripening. Reducing agents may also be used as chemical sensitizers, e.g. the tin compounds described in Belgian Pat. Nos. 493,464 and 568,687, and polyamines such as diethylenetriamine or aminomethylsulphinic acid derivatives, e.g. according to Belgian Pat. No. 547,323. Noble metals such as gold, platinum, palladium, iridium, ruthenium or rhodium and compounds of such metals are also suitable chemical sensitizers. The emulsions may also be sensitized with polyalkylene oxide derivatives, e.g. with a polyethylene oxide having a molecular weight of from 1000 to 20,000, or with condensation products of alkylene oxides and alcohols, aliphatic carboxylic acids, aliphatic amines, aliphatic diamines and amides.

The emulsions may also be optionally sensitized, e.g. with the usual polymethine dyes such as neutrocyanines, basic or acid carbocyanines, rhodacyanines, hemicyanines, styryl dyes, oxonoles and the like. Sensitizers of this type have been described in the work by F. M. Hamer "The Cyanine Dyes and Related Compounds", (1964).

The emulsions may contain the usual stabilizers, e.g. homopolar or salt-type compounds of mercury having aromatic or heterocyclic rings, such as mercaptotriazoles, or simple mercury salts, sulphonium mercury double salts and other mercury compounds. Azaindenes are also suitable stabilizers, particularly tetra- and penta-azaindenes, and especially those which are substituted with hydroxyl or amino groups. Such compounds have been described e.g. in the article by Birr. Z. Wiss. Phot. 47, pages 2 to 58. Other suitable stabilizers include inter alia heterocyclic mercapto compounds, e.g. phenylmercaptotetrazole, quaternary benzothiazole derivatives and benzotriazole.

The layers of the photograhic material may be hardened in the usual manner, for example with formaldehyde or halogen substituted aldehydes which contain a carboxyl group, such as mucobromic acid, diketones, methanesulphonic acid esters, dialdehydes and the like. The photographic layers may also be hardened with epoxide, heterocyclic ethylene imine or acryloyl hardeners. The layers may also be hardened by the process according to German Offenlegungsschrift No. 2,218,009 to produce colour photograhic materials which are suitable for high temperature processing. The photograhic layers or colour photographic multilayered materials may also be hardened with diazine, triazine or 1,2-dihydroquinoline hardeners. Examples of such hardeners include diazine derivatives containing alkylsulphonyl or arylsulphonyl groups, derivatives of hydrogenated diazines or triazines, e.g. 1,3,5-hexahydrotriazine, fluoro substituted diazine derivatives, e.g. fluoropyrimidine, and esters of 2-substituted 1,2-dihydroquinoline- or 1,2-dihydroisoquinoline-N-carboxylic acids. Vinyl sulphonic acid hardeners, carbodiimide and carbamoyl hardeners are also suitable, such as the compounds which have been described for example, in German Offenlegungsschrift Nos. 2,263,602; 2,225,230 and 1,808,685; French Pat. No. 1,491,807; German Pat. No. 872,153 and DDR Pat. No. 7218. Other suitable hardeners have been described for example in British Pat. No. 1,268,550.

EXAMPLE 1

A mordant according to German Offenlegungsschrift 2 928 184.3, polymer No. 7, is added in the quantities indicated in Table 1, in each case to 50 ml of a 10% gelatine solution at 40° C., the mordant solution having previously been adjusted to contain 0.2 equivalents of cationic groups per 1000 ml. The solutions are diluted to 150 ml and, after the addition of 5 ml of saponin solution, they are cast at pH 5.8 on a cellulose acetate substrate by the immersion casting process to form a filter layer from 2.0 to 2.5μ in thickness. The material is covered with a protective layer containing an instant hardener. Merocyanine A corresponding to the following formula, which has been disclosed in German Offenlegungsschrift No. 2,720,540, is added as comparison dye:

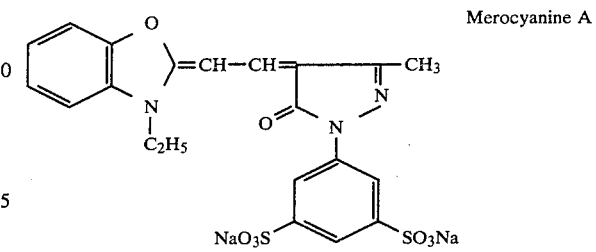

Merocyanine A

To test the resistance to diffusion, the dye layers are washed under running water for 16 hours, and the density is determined before and after the water treatment (cf. table). The materials are then subjected to the following colour negative process:

| Colour development: | |
|---|---|
| 3¼ minutes at 38° C. in a developer of | |
| Sodium hexametaphosphate | 2 g |
| Sodium sulphite (sicc.) | 2.0 g |
| Sodium bicarbonate | 8 g |
| Sodium bisulphate | 7 g |
| Potassium bromide | 1.8 g |
| Sodium carbonate (sicc.) | 30 g |
| Hydroxylamine sulphate | 3 g |
| 4-amino-3-methyl-N—ethyl-N—(β-hydroxyethyl)-aniline | 2.6 g |
| made up with water to 1 l. | |

Further processing is carried out at 38° C. It comprises treatment in the following baths:

| Bleaching bath | 4 minutes 20 seconds |
|---|---|
| Washing | 1 minute 5 seconds |
| Fixing | 4 minutes 20 seconds |
| Washing | 3 minutes 15 seconds |

The formulaions of the baths used are described in "The British Journal of Photography", July 1974, pages 597 and 598.

The results of processing are summarized in the following table 1.

TABLE 1

| mordant ml | Dye No. | mg | Density before washing | Density after 16 hours' washing | absorption in % after washing* |
|---|---|---|---|---|---|
| 16.8 | 2 | 450 | 0.77 | 0.77 | 100 |
| 14.3 | 3 | 460 | 0.66 | 0.57 | 87 |
| 14.5 | 4 | 400 | 0.51 | 0.45 | 88 |
| 16.8 | 5 | 420 | 0.56 | 0.50 | 89 |
| 16.0 | 7 | 450 | 0.89 | 0.76 | 86 |
| 15.1 | 8 | 450 | 0.63 | 0.56 | 89 |
| 15.1 | 9 | 450 | 0.57 | 0.50 | 87 |
| 7.5 | Comparison A | 270 | 0.63 | 0.29 | 52 |

*(based on absorption before washing)

Table 1 shows clearly that the dyes according to the invention are superior to comparison dye A in their capacity to be fixed. All of the samples are completely decolourised during development.

EXAMPLE 2

Dye/gelatine solutions are prepared and processed as in Example 1, but the mordant used is the cationic polyurethane according to German Offenlegungsschrift No. 2 315 304 corresponding to the following formula, adjusted to contain 0.45 equivalents of cationic groups per 1000 ml:

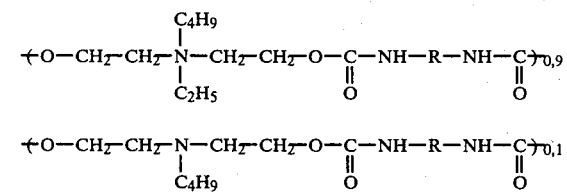

in which R=80% —(CH$_2$)$_6$— and 20%

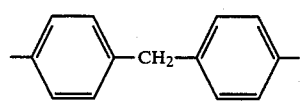

The merocyanine corresponding to the following formula disclosed in British Pat. No. 1,030,392 is used as comparison dye:

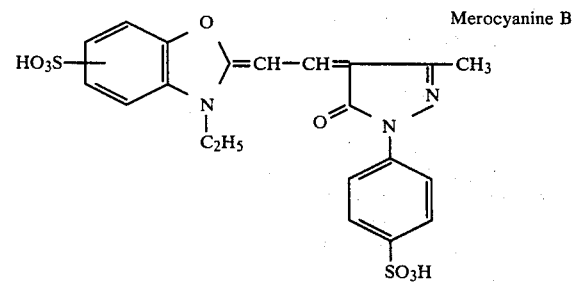

Merocyanine B

Table 2 shows that the dye is less firmly fixed with this polymer than with the polymer used in Example 1 but the dyes according to the invention are again better than comparison dye B.

TABLE 2

| Mordant ml | Dye No. | mg | Density before washing | Density after 16 hours' washing | Absorption in % after washing* |
|---|---|---|---|---|---|
| 6.2 | 3 | 430 | 0.55 | 0.30 | 55 |
| 6.2 | 4 | 350 | 0.57 | 0.29 | 50 |
| 8.2 | 5 | 420 | 0.62 | 0.26 | 42 |
| 7.3 | 8 | 450 | 0.69 | 0.50 | 72 |
| 7.3 | 9 | 450 | 0.68 | 0.39 | 58 |
| 2.9 | Comparison B | 150 | 0.87 | 0.11 | 12 |

*(based on absorption before washing)

EXAMPLE 3

Comparison material

The following layers were applied one after another to a transparent support layer covered with an antihalation layer. The quantities indicated are based in each case on 1 m$^2$. The quantities of silver applied are given in corresponding quantities of AgNO$_3$.

1. A red-sensitive layer of comparatively low sensitivity containing a red sensitized silver idobromide emulsion (6 mol % AgI) of 3.5 g of AgNO$_3$ with 460 mg of a cyan coupler A corresponding to the formula

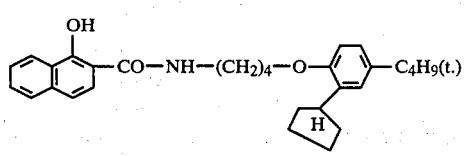

0.24 g of cyan coupler B corresponding to the formula

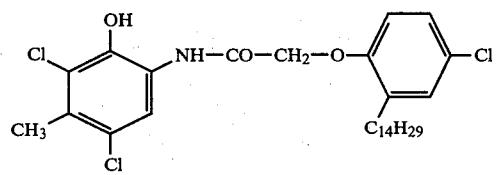

20 mg of a DIR coupler corresponding to the formula

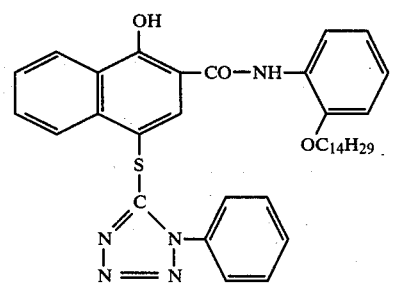

and 3.0 g of gelatine.
2. An intermediate layer of 0.6 g of gelatine.
3. A green-sensitive layer of comparatively low sensitivity containing a green sensitized mixture of a relatively insensitive silver iodobromide emulsion (5 mol % AgI) of 2.0 g of AgNO$_3$ and a relatively highly sensitive silver iodobromide emulsion (6 mol % of AgI) of 2.5 g of AgNO$_3$ with 800 mg of a magenta coupler corresponding to the formula

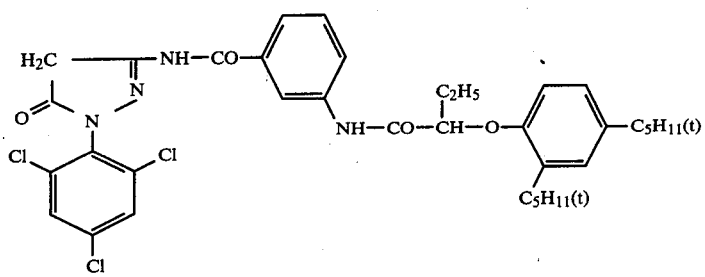

60 mg of DIR coupler corresponding to the formula

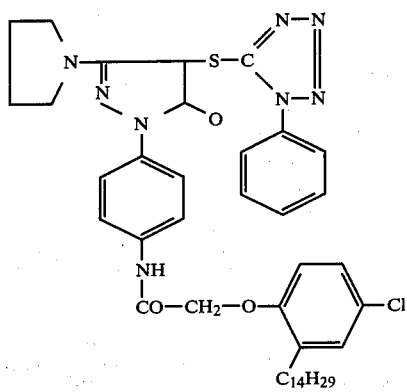

60 mg of a masking coupler corresponding to the formula

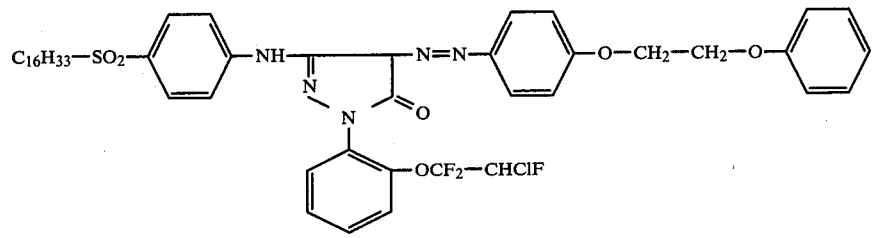

and 4.0 g of gelatine.
4. An intermediate layer containing 0.6 g of gelatine.
5. A highly sensitive red-sensitive layer containing a red-sensitized silver iodobromide emulsion (7 mol % AgI) of 2.0 g of $AgNO_3$ with 150 mg of the cyan coupler A and 60 mg of the cyan coupler B of layer 1.
6. A layer containing an insensitive silver chloride emulsion of 400 mg of $AgNO_3$ and 0.9 g of gelatine.
7. A highly sensitive green-sensitive layer containing a green-sensitized silver iodobromide emulsion (7 mol % of AgI) of 2.2 g of $AgNO_3$ with 240 mg of the magenta coupler of layer 3.
8. An intermediate layer containing 1.5 g of gelatine.
9. A yellow filter layer of colloidal silver having a density of 0.8 (measured behind a blue filter).
10. A low sensitive layer containing a blue-sensitive silver iodobromide emulsion (5 mol % of AgI) of 1.0 g of $AgNO_3$ with 1.0 g of a yellow coupler corresponding to the formula

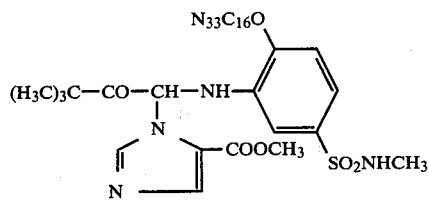

and 1.6 g of gelatine.
11. A highly sensitive layer containing a blue sensitive silver iodobromide emulsion (6 mol % of AgI) of 1.1 g of $AgNO_3$ with 0.5 g of the yellow coupler corresponding to the formula

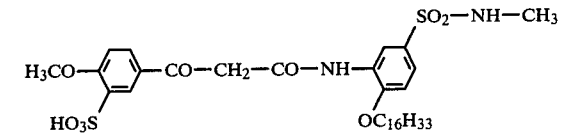

and 2.0 g of gelatine.
12. A covering layer of 1.2 g of gelatine.
13. A hardening layer containing an instant hardener.

MATERIAL ACCORDING TO THE INVENTION

The material according to the invention was prepared by the same method with the difference that, instead of the colloidal silver, a gelatine layer containing the dyes according to the invention together with a mordant as in Example 1, also having a density of 0.8, was introduced into the yellow filter layer (layer 9).

The materials obtained are exposed imagewise behind a graduated wedge and subjected to a colour negative process as in Example 1.

The results obtained are shown in the following Table 3.

TABLE 3

| Dye No. | relative sensitivity | | |
| --- | --- | --- | --- |
| | yellow | magenta | cyan |
| 7 | 42.2 | 38.0 | 39.7 |

TABLE 3-continued

| Dye No. | relative sensitivity | | |
| --- | --- | --- | --- |
| | yellow | magenta | cyan |
| 9 | 42.4 | 37.7 | 40.0 |
| 10 | 41.8 | 38.3 | 40.0 |
| comparison | 42.2 | 36.0 | 38.7 |

An increase in the value of relative sensitivity by three units corresponds to doubling of the sensitivity.

It is seen from Table 3 that replacement of the silver filter yellow by the dyes according to the invention in combination with a mordant results in a marked increase in sensitivity both of the magenta layer and of the cyan layer.

We claim:

1. Light-sensitive photographic material comprising a support layer, having at least one supported light-sensitive silver halide emulsion layer, wherein at least one filter layer contains at least one filtering compound corresponding to the following formula:

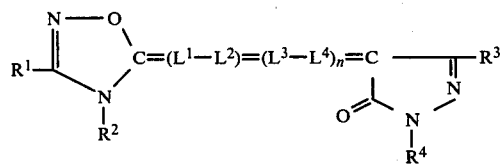

in which $R^1$ represents
   (1) a saturated or unsaturated alkyl or cycloalkyl group which may be substituted or
   (2) an aryl group which may be substituted;

$R^2$ represents a saturated or unsaturated alkyl group which may be substituted $R^3$ represents
   (1) an alkyl or cycloalkyl group which may be substituted;
   (2) an aryl group which may be substituted,
   (3) the group $COOR^5$ or
   (4) the group $CO-NR^6R^7$;

$R^4$ represents
   (1) an alkyl group which may be substituted,
   (2) a heterocyclic group which may be substituted or
   (3) an aryl group which may be substituted;

$R^5$, $R^6$, $R^7$, which may be the same or different, represent
   (1) hydrogen,
   (2) an alkyl group which may be substituted or
   (3) an aryl group which may be substituted and/or $R^6$ and $R^7$ may together represent the ring members required to complete a heterocyclic ring;

$L^1$, $L^2$, $L^3$ and $L^4$ which may be the same or different represent a methine group which may be substituted, and $n = 0$ or $1$ provided that compound I contains at least one water-solubilizing group.

2. Material according to claim 1, in which
$R^1$ represents
   (1) a saturated or unsaturated alkyl or cycloalkyl group having up to 6 carbon atoms which may be substituted or
   (2) a phenyl or naphthyl group which may be substituted;

$R^2$ represents a saturated or unsaturated alkyl group having up to 4 carbon atoms which may be substituted;

$R^3$ represents
   (1) an alkyl or cycloalkyl group having up to 6 carbon atoms which may be substituted,
   (2) a phenyl or naphthyl group which may be substituted,
   (3) the group $COOR^5$ or
   (4) the group $CO-NR^6R^7$;

$R^4$ represents a phenyl or naphthyl group which may be substituted;

$R^5$, $R^6$ and $R^7$ represent
   (1) hydrogen,
   (2) an alkyl group having up to 6 carbon atoms which may be substituted or,
   (3) a phenyl or naphthyl group which may be substituted and/or $R^6$ and $R^7$ together represent the ring members required to complete a 5-membered or 6-membered ring containing nitrogen;

$L^1$, $L^2$, $L^3$ and $L^4$ represents an unsubstituted methine group or a methine group which is substituted with an alkyl group having 1 to 4 carbon atoms or with phenyl, and $n = 0$ or $1$ provided that compound I contains at least one group of the formula $-SO_3H$.

3. Material according to claim 1, in which
$R^1$ represents a methyl or ethyl group, a phenyl or benzyl group which may be substituted or $H_3CO-(CH_2)_2$;

$R^2$ represents $CH_3$ or $C_2H_5$;

$L^1$, $L^2$, $L^3$ and $L^4$ represent $CH$;

$R^3$ represents methyl, ethoxycarbonyl or carbamoyl and $R^4$ represents a phenyl or naphthyl group substituted with at least one sulpho group.

4. Material according to claim 1, in which
$R^4$ represents a phenyl or naphthyl group which is substituted with at least one sulpho group, and compound I contains a total of at least two sulpho groups.

5. Material according to claim 1, which contains a basic polymer as mordant.

6. Material according to claim 5, wherein the basic polymer contains a tertiary or a quaternary nitrogen atom.

7. Material according to claim 1, wherein compound I is present in a quantity of from 10 to 1000 mg per m$^2$.

8. Material according to claim 1, wherein compound I is contained in a filter layer.

9. Material according to claim 8, wherein the filter layer is arranged between a blue sensitive silver halide emulsion layer and the support layer.

* * * * *